2 Sheets—Sheet 1.

AULTMAN & MILLER.

Mowing Machine.

No. 773.

Reissued July 19, 1859.

THE NORRIS PETERS CO., WASHINGTON, D. C.

AULTMAN & MILLER.
Mowing Machine.
No. 773. Reissued July 19, 1859.
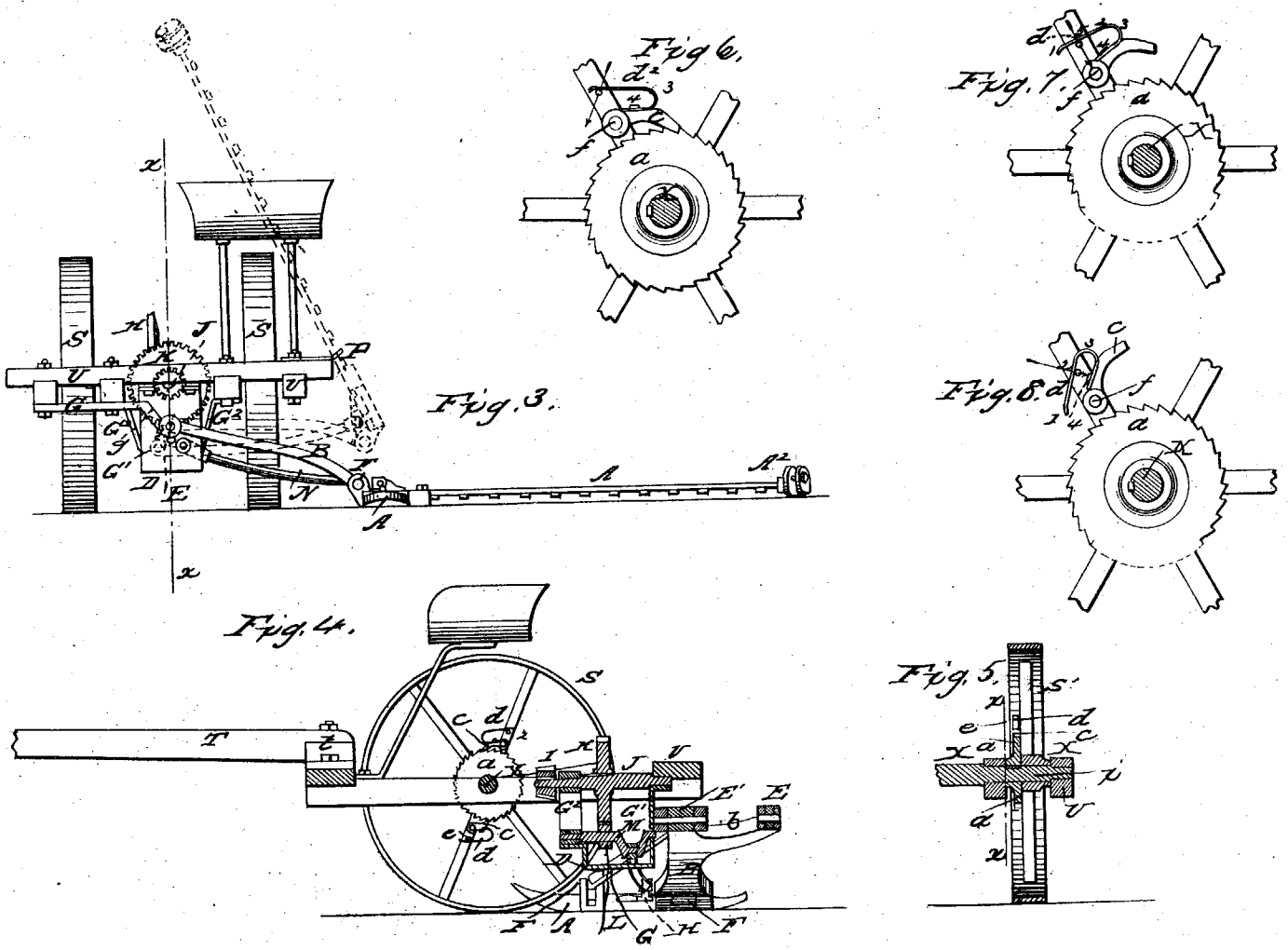
N. PETERS, Photo-Lithographer, Washington, D. C.

UNITED STATES PATENT OFFICE.

C. AULTMAN AND LEWIS MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 773, dated July 19, 1859.

DIVISION D²

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 1:
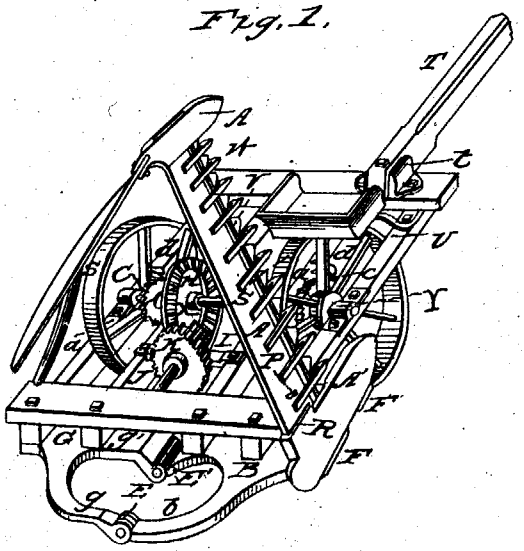
Figure 2:
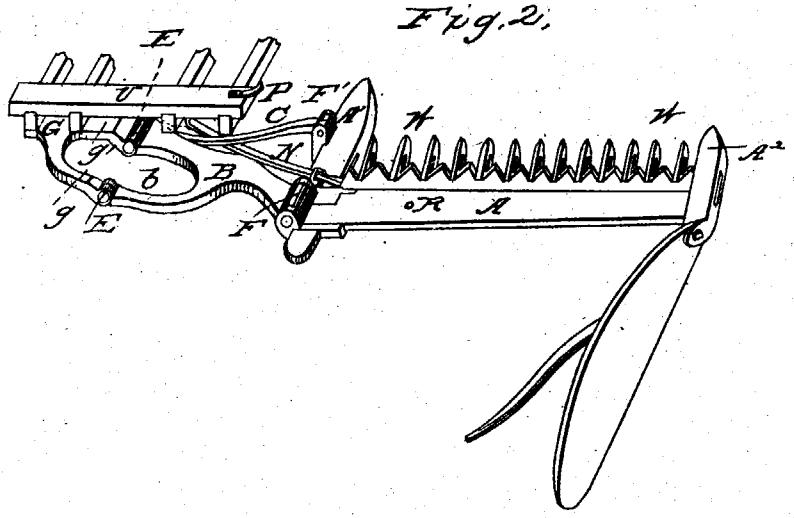

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine, with the finger-beam extended upon the ground for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through wheel and axle. Fig. 6 represents a transverse section at the line *x x* of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure. Fig. 8 represents the same view of the parts shown in Fig. 6, but with the spring and pawl in a third position different from those shown in Figs. 6 and 7.

We term that side of the machine the "right" side which would be at the right hand of a person behind the machine and looking toward it, and the opposite side of the machine we term its "left" side.

Mowing-machines having a heavy finger-beam and cutting apparatus projecting laterally from the main frame in the usual manner are very inconvenient to move from place to place over rough roads, and when moved are liable to be injured, not alone by reason of their great bulk and unwieldiness, but also because of having an excess of weight on one side acting with great leverage, the finger-beam creating a great preponderance on the side on which it projects.

The accompanying drawings represent a mowing-machine in which the main frame U is supported like a cart by two large wheels, S S′, and has a tongue, T, projecting in front for the horses to draw by. The frame carries suitable gearing for giving motion to the cutter.

The finger-beam A is connected to the main frame by an intermediate coupling-arm, B, hinged at its left end to the main frame and at its right to a shoe, A′, to which the left end of the finger-beam is attached.

The hinge by which the shoe is connected to the coupling-arm is in such a position and so constructed as to admit of the right end of the finger-beam being raised on end and leaned on the side of the frame in the position represented in Figs. 1 and 3, and there secured.

What we claim under this patent as our invention is—

The construction and arrangement of the finger-beam and the main frame so that the beam may be turned on its hinge into an upright position and then raised and leaned against the frame to elevate it out of the reach of obstructions and distribute the weight more equally upon the carrying-wheels when the machine is to be removed from one place to another where the mowing is to be done, substantially as described.

In testimony whereof we have hereunto subscribed our names.

CORNELIUS AULTMAN.
LEWIS MILLER.

Witnesses:
DANIEL TONNER,
FRED ORTH.